US007393914B2

(12) United States Patent
Moore et al.

(10) Patent No.: US 7,393,914 B2
(45) Date of Patent: Jul. 1, 2008

(54) POLYETHERSULFONE COMPOSITIONS

(75) Inventors: David Roger Moore, Albany, NY (US); Hongyi Zhou, Niskayuna, NY (US); Daniel Steiger, Clifton Park, NY (US); Joyce Hung, Niskayuna, NY (US); Daniel Joseph Brunelle, Burnt Hills, NY (US); Hongwei Liu, Troy, NY (US); Marianne Elisabeth Harmon, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/193,552

(22) Filed: Jul. 29, 2005

(65) Prior Publication Data
US 2006/0030683 A1 Feb. 9, 2006

(51) Int. Cl.
*C08G 75/00* (2006.01)
*C08G 8/02* (2006.01)
(52) U.S. Cl. .................. 528/391; 528/128; 528/125; 528/171; 528/174; 528/175
(58) Field of Classification Search ............... 528/391, 528/128, 125, 171, 174, 175
See application file for complete search history.

(56) References Cited

U.S. PATENT DOCUMENTS 5,204,442 A * 4/1993 Nye ............................ 528/125
2002/0091225 A1 7/2002 McGrath et al.

FOREIGN PATENT DOCUMENTS

EP 0 383 600 8/1990
EP 383600 A * 8/1990

OTHER PUBLICATIONS

Daletou, M.K., et al, Proton conducting membranes based on blends of PBI with aromatic polyethers containing pyridine units, Journal of Membrane Science, 252, 2005, 115-122.*
Gourdoupi, N, et al, Novel proton-conducting polyelectrolyte composed of an aromatic polyether containing main-chain pyridine units for fuel cell applications, Chem Mater, 2003, 15, 5044-5050.*
Wang, Feng, et al, Direct polymerization of sulfonated poly(arylene ether sulfone) random (statistical) copolymers: candidates for new proton exchange membranes, Journal of Membrance Science, 197, 2002, 231-242.*
Mark Mathias et al., "Can Available Membranes and Catalysts Meet Automotive Polymer Electrolyte Fuel Cell Requirements?", Prepr. Pap.-A. Chem., vol. 49 (2), pp. 471-474, 2004.
Hubert A. Gasteiger et al., "Fundamental Research and Development Challenges In Polymer Electrolyte Fuel Cell Technology", Presented at Proton Conducting Membrane Fuel Cells III Symposium, Salt Lake City, Oct. 2002.
Lina E. Karlsson et al., "Polysulfone Ionomers for Proton-Conductin Fuel Cell Membranes: Sulfoalkylated Polysulfones", Elsevier, Journal of Membrane Science, vol. 230, pp. 61-70, 2004.

Yunsong Yang et al., "Synthesis of Sulfonated Polysulfone-block-PVDF Copolymers: Enhancement of Proton Conductivity in Low Ion Exchange Capacity Membranes", American Chemical Society, Macromolecules, vol. 37, pp. 1678-1681, 2004.
R. Nolte et al., "Partially Sulfonated Poly)arylene ether sulfone)—A Versatile Proton Conducting Membrane Material for Modern energy Conversion Technologies", Elsevier, Journal of Membrane Science, vol. 83, pp. 211-220, 1993.
Jochen Kerres et al., "Development and characterization of Crosslinked Ionomer Membranes Based Upon Sulfinated and Sulfonated PSU Crosslinked PSU Blend Membranes by Disporportionation of Sulfinic Acid Groups", Journal of Membrane Science, Elsevier, vol. 139, pp. 211-225, 1998.
Kenji Miyatake et al., "Novel Sulfonated Poly(arylene ether): A Proton Conductive Polymer Electrolyte Designed for Fuel Cells", American Chemical Society, Macromolecules, vol. 36, pp. 9691-9693, 2003.
F. Lufrano et al., "Sulfonated Polysulfone Ionomer Membranes for Fuel Cells", Elsevier, Solid State Ionics, vol. 145, pp. 47-51, 2001.
Yue Zhang, "Molecular Design Considerations in the Synthesis of High Conductivity PEMS for Fuel Cells", J. S. Polym. Prepr., vol. 40, pp. 480-481, 1999.
Haifeng Zhang et al., "Synthesis, Characterization and Fuel Cell Performance of Poly 2,2'-(P-Phenylene)-5,5'-Bibenzimidazole) As A High Temperature Fuel Cell Membrane", Prepr. Pap.-Am. Chemical Society, Div., Fuel Chem., vol. 49 (2), pp. 588-589, 2004.
Qingfeng Li et al., Approaches and Recent Development of Polymer Electrolyte Membranes for Fuel Cells Operating Above 100° C., American Chemical Society, Chemistry Materials, vol. 15, pp. 4896-4915, 2003.
N. Gourdoupi et al., "Novel Proton-Conducting Polyelectrolyte Composed of an Aromatic Polyether Containing Main-Chain Pyridine Units for Fuel Cell Applications", American Chemical Society, Chemistry Materials, vol. 15, pp. 5044-5050, 2003.
David E. Cladingboel, "A Large, Labroratory-Scale Synthesis of [4-(2-(2H)-Tetrahydropyranyloxy)phenyl]boronic Acid", Organic Process Research & Development, vol. 4, pp. 153-155, 2000.
Feng Wang et al., "Direct Polymerication of Sulfonated Poly(arylene ether sulfone) Random (statistical) Copolymers: Candidates for New Proton Exchange Membranes", Journal of Membrane Science, vol. 197, pp. 231-242, 2002.

* cited by examiner

*Primary Examiner*—Randy Gulakowski
*Assistant Examiner*—Alicia Toscano
(74) *Attorney, Agent, or Firm*—Andrew J. Caruso; William E. Powell

(57) ABSTRACT

Novel polyethersulfone compositions have been discovered which incorporate structural subunits derived from sulfonated bis(halophenyl)sulfones, dihydroxy terphenyls, and/or bis(hydroxyphenyl)pyridines. The sulfonated polyethersulfones show promise as materials for use in polymer electrolyte membranes (PEMs) in fuel cells owing to their high proton conductivities (0.02-0.07 S/cm at 20° C. and 100 percent humidity). In addition, a novel unsulfonated thermoplastic polyethersulfone comprising structural subunits derived from a non-sulfonated bis(halophenyl)sulfone bis4-fluorophenyl)sulfone and 4,4'-dihydroxyphenyl-2,6-pyridine (CAS No. 171820-16-9) is disclosed.

25 Claims, No Drawings

POLYETHERSULFONE COMPOSITIONS

BACKGROUND OF THE INVENTION

This invention relates to novel polymeric compositions, methods for their preparation, and their use. In one aspect the present invention relates to polyethersulfone compositions, materials useful in fuel cells comprising polymer electrolyte membranes (PEMs).

Fuel cells incorporating solid polymer electrolyte membranes have attracted significant attention as reliable, clean sources of energy, in particular for transportation and portable devices. Hydrogen PEM fuel cells generate electricity (that can be converted to power) through the electrochemical coupling of hydrogen and oxygen and leave water as the product. Notwithstanding the progress achieved in fuel cell technology over the last forty years, additional improvements are required. A key to enabling new fuel cell technologies lies in discovery of novel, high-performance membrane materials.

Currently available fuel cell membrane materials suffer from high cost, poor chemical, mechanical, and thermal properties, and/or insufficient conductivities under the necessary temperature and humidity requirements (0.1 S/cm at 80° C. and 50% relative humidity).

Thus, there is a continuing need to develop improved polymeric materials for use in the fuel cell arena and in other applications in which known polymeric compositions are unsuited. Specifically, there is a need for polymer compositions suitable for use as membranes in fuel cells. It would be desirable therefore to provide new polymeric materials and methods for their preparation.

BRIEF SUMMARY OF THE INVENTION

In one aspect the present invention provides a polymer composition comprising structural units I

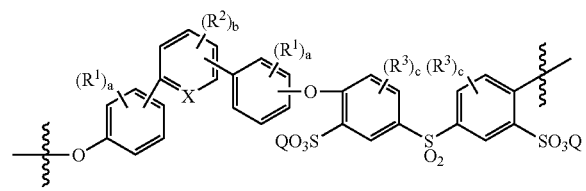

I wherein $R^1$, $R^2$ and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; X is N, $^+$NH, CH, or C; Q is independently at each occurrence hydrogen, a metal cation, or an organic cation; "a" and "b" are independently at each occurrence integers from 0 to 4; and "c" is independently at each occurrence an integer from 0 to 3.

In a second aspect the present invention provides an article comprising a polyethersulfone composition comprising structural units I.

In a third aspect the present invention provides a method of preparing polyethersulfones comprising structural units I.

In a fourth aspect the present invention provides polyethersulfone compositions comprising structural units III

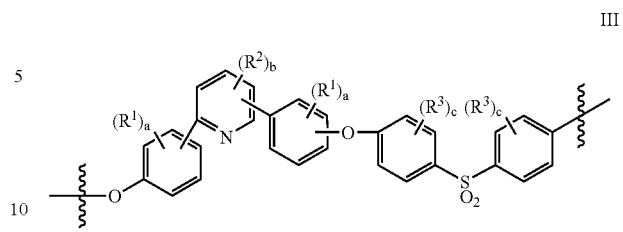

III wherein $R^1$, $R^2$, and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; "a" and "b" are independently at each occurrence integers from 0 to 4; and "c" is independently at each occurrence an integers from 0 to 4.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF$_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_r$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g. methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis(phenyl), and the like. The term "a C$_3$-C$_{10}$ aromatic radical" includes aromatic radicals containing at least three but no more than 10 carbon atoms. The aromatic radical 1-imidazolyl (C$_3$H$_2$N$_2$—) represents a C$_3$ aromatic radical. The benzyl radical (C$_7$H$_7$—) represents a C$_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group (C$_6$H$_{11}$CH$_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a C$_6$ cycloaliphatic radical comprising a methyl group, the methyl group being a functional group which is an alkyl group. Similarly, the 2-nitrocyclobut-1-yl radical is a C$_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —C$_6$H$_{10}$C(CF$_3$)$_2$C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g. CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$C$_6$H$_{10}$—), 4-aminocarbonylcyclopent-1-yl (i.e., NH$_2$COC$_5$H$_8$-), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —O C$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g. (CH$_3$O)$_3$SiCH$_2$CH$_2$C$_6$H$_{10}$—), 4-vinylcyclohexen-1-yl, vinylidenebis (cyclohexyl), and the like. The term "a C$_3$-C$_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C$_6$ aliphatic radical comprising a methyl group, the methyl group being a functional group which is an alkyl group. Similarly, the 4-nitrobut-1-yl group is a C$_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g. —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e.—CHO), hexyl, hexamethylene, hydroxymethyl (i.e.—CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e. (CH$_3$)$_3$Si—), t-butyldimethylsilyl, 3-trimethyoxysilypropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH2)$_9$—) is an example of a C$_{10}$ aliphatic radical.

As noted, in a first aspect, the present invention relates to a polymer composition comprising structural units I

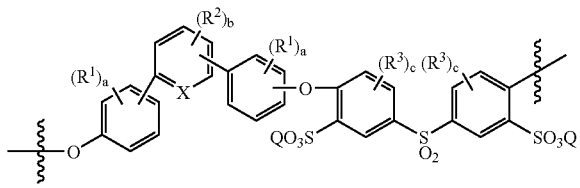

I wherein $R^1$, $R^2$ and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; X is N, $^+$NH, CH, or C; Q is independently at each occurrence hydrogen, a metal cation, a non-metallic inorganic cation, or an organic cation; "a" and "b" are independently at each occurrence integers from 0 to 4; and "c" is independently at each occurrence an integer from 0 to 3.

Polymer compositions comprising structural units I are referred to herein as sulfonated polyethersulfones, owing to the presence of both ether linkages (—O—), sulfone (—SO$_2$—) linkages, and sulfonate groups comprising a charge-balancing counterion (QO$_3$S—) as features of the polymer structure. Structure I need not be regarded as the "repeat unit" of the polymer, but rather as a structural unit present in the polymer. For example, a polymer composition might comprise a plurality of structural units I as part of the polymer chain and yet no two structural units I are adjacent to one another in the polymer chain (i.e. repeat), such as might be the case in a random copolyethersulfone composition comprising structural units derived from bis(4-fluorophenyl)sulfone (CAS No. [383-29-9] also referred to at times herein as 4,4'-difluorophenylsulfone); 4,4'-difluoro-3,3'-disodiumsulfonated-phenylsulfone (s-DFDPS); 4,4'-dihydroxyphenyl-2,6-pyridine; and bisphenol A, wherein the amounts of bisphenol A and bis(4-fluorophenyl)sulfone employed make the probability of finding adjacent structural units I highly unlikely (for example less than 5 percent of all such structural groups I in the polymer chain are adjacent to at least one other structural group having the same structure). Alternatively, structure I may constitute essentially all of the internal structural units (all structural units apart from the end groups of the polymer chain) of the composition and as such represent the "repeat unit" of the polymer chain.

As noted, Q is independently at each occurrence a hydrogen (as in HO$_3$S—); a metal cation, for example an alkali metal cation alkaline or an alkaline earth metal cation; a non-metallic inorganic cation such as the ammonium cation ($^+$NH$_4$); or an organic cation, for example an organic phosphonium salt or an organic ammonium salt. Alkali metal cations are illustrated by lithium ions, sodium ions, and potassium ions. Alkaline earth metal cations are illustrated by magnesium ions, calcium ions, and barium ions. Those skilled in the art will understand that Q is a charge-balancing counterion having an overall charge of +1. Thus, those skilled in the art will further understand that when Q comprises a polyvalent cation such as Mg$^{2+}$ then Q will be represented in structure I as "(Mg$^{2+}$)$_{1/2}$" in order that the single negative charge of the sulfonate groups ($^-$O$_3$S—) are appropriately balanced by the counterion Q. Thus, Q may comprise a multivalent cation such as Fe$^{3+}$, or a multivalent organic cation such as 1,10-bis(trimethylammonium)decane. In the two cases cited, Q would be represented in structure I by (Fe$^{3+}$)$_{1/3}$ and (Me$_3$N$^+$(CH$_2$)$_{10}$N$^+$Me$_3$)$_{1/2}$ respectively. Metal cations include transition metal cations. In one embodiment, Q is a proton. In an alternate embodiment Q is a sodium ion.

In one embodiment, the present invention provides a polymer composition comprising structural units I, said structural units I comprising subunits derived from 1,3-(bis(4-hydroxyphenyl))benzene. In an alternate embodiment, the present invention provides a polymer composition comprising structural units I, said structural units I comprising subunits derived from 1,4-(bis(4-hydroxyphenyl))benzene. In yet another embodiment, the present invention provides a polymer composition comprising structural units I, said structural units I comprising subunits derived from 2,6-(bis(4-hydroxyphenyl))pyridine. In yet still another embodiment, the present invention provides a polymer composition comprising structural units I, said structural units I comprising subunits derived from at least one of 1,3-(bis(4-hydroxyphenyl))benzene, 1,4-(bis(4-hydroxyphenyl))benzene, and 2,6-(bis(4-hydroxyphenyl))pyridine. In an alternate embodiment, the present invention provides a polymer composition comprising structural units I, said structural units I comprising subunits derived from both 1,3-(bis(4-hydroxyphenyl))benzene, and 2,6-(bis(4-hydroxyphenyl))pyridine.

Typically, the polymer compositions provided by the present invention comprise sulfonyl group containing subunits derived from a bis(halophenyl)sulfone. In one embodiment, the polymer compositions provided by the present invention comprise sulfonyl group containing subunits derived from a bis(4-halophenyl)sulfone having structure II

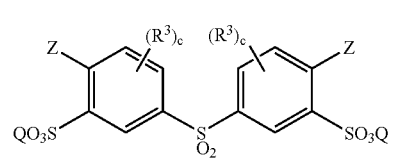

II wherein Z is independently at each occurrence fluoro, chloro, or bromo; $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; and "c" is independently at each occurrence an integer from 0 to 3. Q is defined as in structure I.

Suitable bis(4-halophenyl)sulfones having structure II include: 4,4'-difluoro-3,3'-disodiumsulfonated-phenylsulfone; 4,4'-difluoro-3,3'-postassiumsulfonated-phenylsulfone; 4,4'-dichloro-3,3'-disodiumsulfonated-phenylsulfone; 4,4'-dichloro-3,3'-dipotassiumsulfonated-phenylsulfone; and 4,4'-difluorophenylsulfone-3,3-bis(sulfonic acid). The bissulfonic acid is the free bissulfonic acid (Q=H in structure II) resulting from acidification of the corresponding salt. For example, acidification of 4,4'-difluoro-3,3'-disodiumsulfonated-phenylsulfone affords 4,4'-difluorophenylsulfone-3,3-bis(sulfonic acid). Those skilled in the art will recognize that suitable bissulfonic acids having structure II may be prepared directly from the corresponding bis(4-halophenyl)sulfone via sulfonation with, for example, hot fuming sulfuric acid.

As noted, in yet another aspect the present invention provides polyethersulfone compositions comprising structural units III

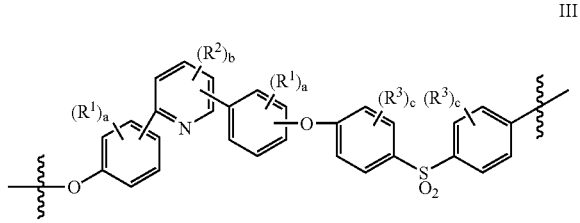

III wherein $R^1$, $R^2$ and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; "a" and are independently at each occurrence integers from 0 to 4; and "c" is independently at each occurrence an integers from 0 to 4.

Those skilled in the art will recognize that structural units III do not include sulfonate groups comprising a charge-balancing counterion ($QO_3S$—). Thus with respect to subscript "c" in structure III, a maximum of four positions are available on each of the aromatic rings for substitution by $R^3$.

In one embodiment, the present invention provides a polymer composition comprising structural units III, said structural units III comprising subunits derived from 2,6-(bis(4-hydroxyphenyl))pyridine. In an alternate embodiment the present invention provides a polymer composition comprising structural units III, said structural units III comprising subunits derived from 2,6-(bis(4-hydroxyphenyl))pyridine and 1,3-(bis(4-hydroxyphenyl))benzene. In still yet another embodiment the present invention provides a polymer composition comprising structural units III, said structural units III comprising subunits derived from 2,6-(bis(4-hydroxyphenyl))pyridine and 1,4-(bis(4-hydroxyphenyl))benzene. In another embodiment, the present invention provides a polymer composition comprising structural units III, said structural units III comprising subunits derived from 2,6-(bis(4-hydroxyphenyl))pyridine and at least one of 1,3-(bis(4-hydroxyphenyl))benzene and 1,4-(bis(4-hydroxyphenyl))benzene. In yet another embodiment, the present invention provides a polymer composition comprising structural units III, said structural units III comprising subunits derived from at least one of 2,6-(bis(4-hydroxyphenyl))pyridine; 2,5-(bis(4-hydroxyphenyl))pyridine; and 3,5-(bis(4-hydroxyphenyl))pyridine.

In one embodiment of the present invention, the polymer composition comprising structural units III further comprises subunits IV

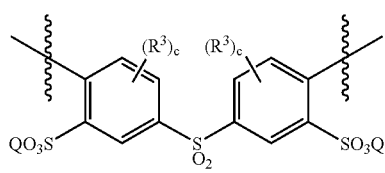

IV wherein $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; Q is independently at each occurrence hydrogen, a metal cation, a non-metallic inorganic cation, or an organic cation; and "c" is independently at each occurrence an integer from 0 to 3

In one embodiment the polymer composition comprising structural III comprises subunits derived from at least one bis(halophenyl)sulfone. In another embodiment the polymer composition comprising structural III comprises subunits derived from at least one bis(halophenyl)sulfone selected from the group consisting of bis(4-chlorophenyl)sulfone and bis(4-fluorophenyl)sulfone.

As noted, in a second aspect the present invention provides an article comprising a polyethersulfone composition comprising structural units I, III, or a combination of structural units I and III. Thus the article may comprise a polyethersulfone composition, said composition comprising structural units I or structural units III. Or the article may comprise a polyethersulfone composition which comprises both structural units I and III. The article is not particularly limited. In one embodiment, the article is a film. In another embodiment, the article is a polymer bead, for example an ion-exchange resin bead. The article may be a membrane. In an alternate embodiment, the article is a molded article such as an automotive lamp housing.

In one embodiment, the article comprising a polyethersulfone composition comprising structural units I is a fuel cell membrane. The sulfonated polyethersulfone (s-PES) compositions of the present invention comprising structural units I demonstrate excellent potential for fuel cell applications based upon their good thermal and mechanical properties and their promising proton conductivities (~0.1 S/cm). The compositions of the present invention are thermally robust and possess glass transition temperatures suitable for use in relatively harsh operating environments (e.g. 120-150° C.) to which fuel cell membranes are typically subjected. In addition, the properties of both the sulfonated and non-sulfonated polymer compositions of the present invention show promise as high-performance thermoplastics.

The compositions of the present invention also show promise in direct methanol fuel cell applications. Thus, in one embodiment, the present invention provides a methanol fuel cell membrane, said membrane comprising a polyethersulfone composition, said composition comprising structural units I.

Various methods may be employed to prepare the polyethersulfone compositions of the present invention. Two techniques are typically employed: 1) Post-sulfonation (i.e. direct sulfonation of a non-sulfonated polyethersulfone composition) using a sulfonating reagent such as $SO_3$, $ClSO_3H$, $Me_3SiSO_3Cl$, or concentrated $H_2SO_4$); and 2) Pre-sulfonation (i.e. condensation polymerization of at least one sulfonated monomer with at least one dihydroxy aromatic compound). The use of sulfonated monomers is at times preferred since it typically allows greater control of polymer architecture and compositions having unique microstructures are provided by the present invention. In one embodiment, the present invention provides a polyethersulfone composition comprising structural units I which is a block copolymer. In an alternate embodiment, the present invention provides a polyethersulfone composition comprising structural units I which is a random copolymer. In yet another embodiment, the present invention provides a polyethersulfone composition comprising structural units III which is a block copolymer. In still yet another embodiment, the present invention provides a polyethersulfone composition comprising structural units III which is a random copolymer.

In one embodiment, the present invention provides a method for preparing a polyethersulfone composition comprising structural units I, said method comprising:
  contacting in a solvent in the presence of a base under reactive conditions
  (a) at least one dihydroxy aromatic compound having structure V

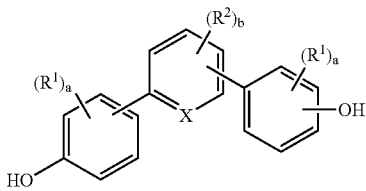

V wherein $R^1$, and $R^2$ are independently at each occurrence halogen, a $C_1$-$C_{10}$ aliphatic radical, a $C_3$-$C_{12}$ cycloaliphatic radical, or a $C_3$-$C_{15}$ aromatic radical; X is N, $^+$NH, CH, or C; and "a" and "b" are independently at each occurrence integers from 0 to 4;

with (b) at least one disulfonated bis(4-halophenyl)sulfone having structure II

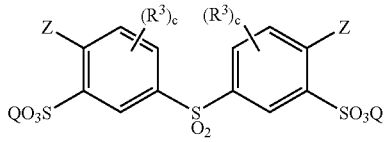

II wherein, in structure II, Z is independently at each occurrence fluoro, chloro, or bromo; $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; Q is independently at each occurrence hydrogen, a metal cation, a non-metallic inorganic cation, or an organic cation; and "c" is independently at each occurrence an integer from 0 to 3;

and, optionally, (c) one or more dihalodiphenyl sulfones having structure VI

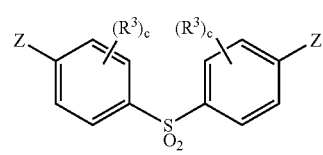

VI wherein, in structure VI, Z is independently at each occurrence fluoro, chloro, or bromo; $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; and "c" is independently at each occurrence an integer from 0 to 4.

Suitable solvents for use according to the method of the present invention include aromatic solvents such as toluene, xylene, anisole, chlorobenzene, and orthodichlorobenzne. Other suitable solvents include dimethylacetamide, dimethylsulfoxide, and N-methylpyrrolidinone.

Suitable bases include inorganic bases such as sodium carbonate, sodium hydroxide, sodium hydride, potassium carbonate, potassium hydroxide, lithium carbonate, lithium hydroxide, cesium carbonate, and mixtures thereof.

The expression "under reactive conditions" refers to reaction parameters such as the relative amounts of the reactants, the initial concentration of the reactants, and the temperature to which the reactants are heated in order to achieve useful reaction rates. The experimental section illustrates typical reactive conditions employed in the preparation of the polymer compositions of the present invention. Typically, synthetically useful reaction rates are achieved at reaction temperatures in a range between about 80° C. and about 200° C.

Typically, the at least one dihydroxy aromatic compound having structure V, the at least one disulfonated bis(4-halophenyl)sulfone having structure II, and the optional one or more dihalodiphenyl sulfones having structure VI, are employed in amounts such that the molar ratio of all of the dihydroxy aromatic compounds to all of the disulfonated bis(4-halophenyl)sulfone and dihalodiphenyl sulfone compounds is in a range between about 0.95:1 to about 1:0.95. In one embodiment, the molar ratio of all of the dihydroxy aromatic compounds to all of the disulfonated bis(4-halophenyl)sulfone and dihalodiphenyl sulfone compounds is in a range between about 0.97:1 to about 1:0.97.

Dihydroxy aromatic compound having structure V are illustrated by 1,3-(bis(4-hydroxyphenyl))benzene; 1,4-(bis(4-hydroxyphenyl))benzene; 1,2-(bis(4-hydroxyphenyl))benzene; 2,6-(bis(4-hydroxyphenyl))pyridine; 2,5-(bis(4-hydroxyphenyl))pyridine; and 3,5-(bis(4-hydroxyphenyl))pyridine.

Disulfonated bis(4-halophenyl)sulfones having structure II are illustrated by 4,4'-difluoro-3,3'-disodiumsulfonatedphenylsulfone; 4,4'-difluoro-3,3'-postassiumsulfonated-phenylsulfone; 4,4'-dichloro-3,3'-disodiumsulfonated-phenylsulfone; 4,4'-dichloro-3,3'-dipotassiumsulfonated-phenylsulfone; and 4,4'-difluorophenylsulfone-3,3-bis(sulfonic acid).

Dihalodiphenyl sulfones having structure VI are illustrated by bis(4-bromophenyl)sulfone, bis(4-chlorophenyl)sulfone, and bis(4-fluorophenyl)sulfone.

In one embodiment of the present invention, at least one dihydroxy aromatic compound in addition to the at least one dihydroxy aromatic compound having structure V is employed. Suitable dihydroxy aromatic compound include bisphenols having general structure IX

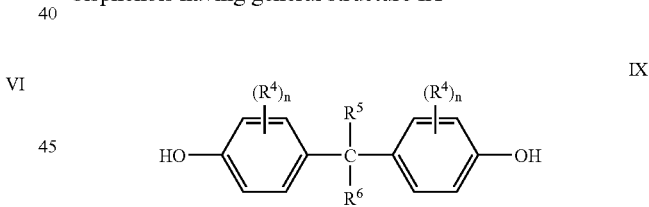

IX wherein $R^4$ is independently at each occurrence a halogen, a $C_1$-$C_{30}$ aliphatic radical, a $C_3$-$C_{30}$ cycloaliphatic radical, or a $C_3$-$C_{30}$ aromatic radical, $R^5$ and $R^6$ are independently hydrogen, a $C_1$-$C_{30}$ aliphatic radical, $C_3$-$C_{30}$ cycloaliphatic radical, or a $C_3$-$C_{30}$ aromatic radical or $R^5$ and $R^6$ together form a $C_3$-$C_{20}$ cycloaliphatic radical and "n" is independently at each occurrence an integer having a value 0 to 4.

Thus, in one embodiment, the polyethersulfone compositions comprise at least one subunit derived from at least one bisphenol having structure IX. Typically, subunits derived from bisphenols having structure IX represent less than about 60 mole percent of all subunits derived from dihydroxy aromatic compounds. The polyethersulfone compositions of the present invention typically comprise subunits derived from one or more dihydroxy aromatic compounds having structure V in an amount corresponding to least 40 mole percent of all subunits derived from dihydroxy aromatic compounds. In one embodiment, the polyethersulfone compositions of the present invention comprise subunits derived from one or more dihydroxy aromatic compounds having structure V in an amount corresponding to least 75 mole percent of all subunits derived from dihydroxy aromatic compounds. In yet another embodiment, the polyethersulfone compositions of the present invention comprise subunits derived from one or more dihydroxy aromatic compounds having structure V in an amount corresponding to least 90 mole percent of all subunits derived from dihydroxy aromatic compounds.

The hydroxy-substituted aromatic compounds having a formula IX are illustrated by bisphenols selected from the group consisting of 1,1-bis(4-hydroxyphenyl)cyclopentane; 2,2-bis(3-allyl-4-hydroxyphenyl)propane; 2,2-bis(2-t-butyl-4-hydroxy-5-methylphenyl)propane; 2,2-bis(3-t-butyl-4-hydroxy-6-methylphenyl)propane; 2,2-bis(3-t-butyl-4-hydroxy-6-methylphenyl)butane; 2,2-bis(3-methyl-4-hydroxyphenyl)propane; 2,2-bis(4-hydroxyphenyl)-1,1,1,3,3,3-hexafluoropropane; 1,1-bis(4-hydroxyphenyl)-2,2,2-trichloroethane; 1,1-bis(4-hydroxyphenyl)norbornane; 1,2-bis(4-hydroxyphenyl)ethane; 1,3-bis(4-hydroxyphenyl) propenone; bis(4-hydroxyphenyl) sulfide; 4,4-bis(4-hydroxyphenyl)pentanoic acid: 4,4-bis(3,5-dimethyl-4-hydroxyphenyl)pentanoic acid; 2,2-bis(4-hydroxyphenyl) acetic acid; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (bisphenol-A); 1,1-bis(4-hydroxyphenyl)propane; 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane; 2,2-bis(4-hydroxy-3,5-dimethylphenyl)propane; 2,2-bis(3,5,3',5'-tetrachloro-4,4'-dihydroxyphenyl)propane; 1,1-bis(4-hydroxyphenyl)cyclohexylmethane; 2,2-bis(4-hydroxyphenyl)-1-phenylpropane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane: 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane; 1,1-bis(4-hydroxyphenyl)decane; 1,1-bis(4-hydroxyphenyl)cyclododecane; 1,1-bis(3,5-dimethyl-4-hydroxyphenyl)cyclododecane; and bis(4-hydroxyphenyl)methane.

The polyethersulfone compositions disclosed herein may further comprise art-recognized additives including organic and inorganic pigments, dyes, impact modifiers, UV screeners, hindered amine light stabilizers, degassing agents, viscosity modifying agents, corrosion inhibitors, surface tension modifiers, surfactants, flame retardants, organic and inorganic fillers, stabilizers, and flow aids.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, and temperature is in ° C.

Tetrahydrofuran (also known as 'THF') was purified prior to use through a Solv-Tek solvent purification system containing columns packed with activated R3-15 deoxygenation catalyst and 8-14 mesh activated alumina. [Solv-Tek, Inc. 216 Lewisville Road Berryville, Va. 22611, sales@solvtek.com] Pd(PPh$_3$)$_4$ was purchased from Strem Chemicals, and used as received. All other chemicals were purchased from Aldrich and used as received. The reactions with air- and/or water-sensitive compounds were carried out under dry nitrogen purified by passage through Trigon Technologies BIG MOISTURE TRAPS using standard Schlenk line techniques. NMR spectra were recorded on a Bruker Advance 400 (1H, 400 MHz) spectrometer and referenced versus residual solvent shifts.

PREPARATION OF 2-(4-BROMOPHENOXY)TETRAHYDRO-2H-PYRAN

The 2-(4-Bromophenoxy)tetrahydro-2H-pyran was synthesized in 95% yield according to literature procedure reported in Cladingboel, D. E., *Organic Process Research & Development* 2000, 4, 153-155 which is incorporated herein by reference in its entirety. The initially isolated crystalline product contained ethanol; therefore, the crystals were melted and the volatiles were removed in vacuo. Ethanol was removed to avoid interference with subsequent Grignard reagent formation.

PREPARATION OF 4,4'-DIHYDROXY-m-TERPHENYL

The procedure employed was a modification of that disclosed by Nye and Swint (Nye, S. A.; Swint, S. A. *4,4'-Dihydroxy-Meta-Terphenyl—Part 1: Synthesis and Derivatives*; U.S. Pat. No. 5,204,442, 1993). Magnesium turnings were activated by washing with 15% HCl$_{(aq)}$ volume/volume (v/v) followed by washing with water, and acetone. The washed turnings were then dried in vacuo. The magnesium turnings (3.98 g, 163.8 mmol), iodine (~1 crystal), and dry THF (60 ml) were then added to an oven-dried, 500 ml, three-necked round bottom flask equipped with a thermocouple, reflux condenser, and addition funnel. The reaction setup was kept under a nitrogen atmosphere throughout the procedure. 2-(4-Bromophenoxy)tetrahydro-2H-pyran (42.01 g, 163.4 mmol) was dissolved in dry THF (120 ml) (Caution: slight endotherm). The resultant solution was added dropwise to the stirred mixture of magnesium and THF over the course of about 1 hour. After approximately 10 minutes, the initiation of Grignard reagent formation was observed. (Caution: Grignard reactions are highly exothermic, appropriate precautions must be taken). On complete addition of the 2-(4-bromophenoxy)tetrahydro-2H-pyran, the reaction was warmed to reflux and stirred vigorously for 2 hours. While the reaction mixture was maintained at reflux, Pd(PPh$_3$)$_4$ (0.633 g, 0.548 mmol, 0.75 mol %) in dry THF (10 ml) was added via an addition funnel, followed by the dropwise addition of 1,3-dibromobenzene (17.3 g, 73.3 mmol) in THF (60 ml) over a period of two hours, and the resultant mixture was heated at reflux overnight. The solution was then cooled to room temperature and water (100 ml) and brine (100 ml) were added. The organic layer was collected and the organics were extracted from the aqueous layer with THF (2×50 ml), dried over MgSO$_4$, filtered, and dried in vacuo to afford the crude product as a light orange oil. The oil was dissolved in THF (100 ml) and MeOH (20 ml) and stirred at ambient temperature. Concentrated HCl (6.0 ml, 73.8 mmol) was then added via syringe. The mixture was stirred overnight and then water (100 ml) was added. The organic layer was separated, dried over MgSO$_4$, filtered, and concentrated in vacuo to afford a brown solid which was triturated with chloroform (150 ml) to provide a light brown solid. The light brown solid was dissolved in boiling toluene (500 ml), and the resultant solution was filtered and allowed to crystallize to give an off-white solid. $^1$H-NMR spectroscopy showed the solid to be 4,4'-dihydroxy-meta-terphenyl (97 percent purity). The off-white solid was then recrystallized from an ethanol:water (1:1) mixture at −20° C. to give the product, 4,4'-dihydroxy-meta-terphenyl (4,4'-dihydroxy-m-terphenyl), of >99% purity (9.83 g, 56% yield), $^1$H-NMR (DMSO-d$_6$, 400 MHz) δ 9.57 (2H, s, OH), 7.72 (1H, s, ArH), 7.56 (4H, d, J=7 Hz, ArH), 7.46 (3H, m, ArH), 6.87 (4H, d, J=7 Hz, ArH).

PREPARATION OF 4,4'-DIHYDROXYPHENYL-2,6-PYRIDINE

The procedure followed was adapted from that disclosed by Gourdoupi, N.; Andreopoulou, A. K.; Deimede, V.; and Kallitsis, J. K., *Chem. Mater.* 2003, 15, 5044-5050. Magnesium turnings (2.00 g, 82.3 mmol), iodine (one crystal), and dry THF (30 ml) were added to an oven-dried, 500 ml, three-necked round bottom flask equipped with a thermocouple, refluxing condenser, and addition funnel. The reaction setup was kept under a nitrogen atmosphere. 2-(4-Bromophenoxy) tetrahydro-2H-pyran (21.1 g, 82.0 mmol) was dissolved in dry THF (60 ml). The resultant solution was added dropwise to the stirred mixture of magnesium and THF over the course of about 1 hour. After approximately 10 minutes the inititiation of Grignard reagent formation was observed. Following the complete addition of the 2-(4-bromophenoxy)tetrahydro-2H-pyran, the reaction was warmed to reflux and stirred vigorously for 2 hours. While the reaction mixture was maintained at reflux, Pd(PPh$_3$)$_4$ (0.344 g, 0.298 mmol, 0.79 mol %) in dry THF (10 ml) was added via an addition funnel. Then 2,6-dibromopyridine (8.88 g, 37.5 mmol) in THF (60 ml) was added dropwise over the course of about two hours and the resultant mixture was heated at reflux overnight. The solution was cooled to room temperature followed by addition of water (100 ml) and brine (100 ml). The organic layer was separated. The aqueous layer was extracted with a 1:1 (by volume) mixture of THF and ethyl acetate (EtOAc) (2×50 ml), and the extracts were combined and dried over MgSO$_4$, filtered, and concentrated in vacuo to afford the crude product as a brown oil. The crude product was dissolved in a mixture of THF (100 ml) and MeOH (20 ml). Concentrated HCl (4.0 ml, 49.2 mmol) was then added via syringe to the stirring solution. After stirring for 1 hour, the resultant yellow precipitate was filtered, added to a 1:1 (by volume) solution of THF and ethyl acetate (50 ml) and neutralized with by treatment with 2 molar aqueous sodium carbonate (Na$_2$CO$_3$; 2×50 ml). The yellow precipitate dissolved in the organic layer upon neutralization. The organic layer was separated, dried over MgSO$_4$, filtered, and concentrated in vacuo to afford a brown oil. Column chromatography on Silica-gel (39:60:1 EtOAc:hexane:MeOH) gave the product, 4,4'-dihydroxyphenyl-2,6-pyridine, (having a purity of approximately 97% as shown by $^1$H-NMR spectroscopy) (5.01 g, 55% yield). $^1$H NMR (DMSO-$d_6$, 400 MHz) δ 9.74 (2H, s, OH), 8.05 (4H, d, J=8 Hz, ArH), 7.80 (1H, t, J=8 Hz, ArH), 7.68 (2H, d, J=8 Hz, ArH), 6.90 (4H, d, J=8 Hz, ArH).

PREPARATION OF 4,4'-DIFLUORO-3,3'-DISODIUMSULFONATED-PHENYLSULFONE (S-DFDPS)

The method employed for the synthesis of 4,4'-difluoro-3,3'-disodiumsulfonated-phenylsulfone is given in Harrison, W. L.; Wang, F.; Mecham, J. B.; Bhanu, V. A.; Hill, M.; Kim, Y. S.; McGrath, J. E., *J. of Polym. Sci. Part A-Polym. Chem.* 2003, 41, 2264-2276. In a 100 ml round bottom flask equipped with a reflux condenser attached to a bubbler, 4,4'-difluorophenylsulfone (71.2 g, 280 mmol) and fuming sulfuric acid (30%) (135 ml) were stirred at 110° C. for 12 hours. The brown solution was cooled to room temperature and poured (CAUTION) into 1.5 kg of ice water. Sodium chloride (400 g) was then added slowly to afford a white precipitate. The solid was filtered, redissolved in water, and the mixture was adjusted to pH 8 with 2 molar sodium hydroxide solution (NaOH). Sodium chloride (400 g) was again added slowly to the solution, resulting in the precipitation of a white solid. The solid was filtered and dried in vacuo. The product was crystallized in two crops from a 9:1 MeOH:$H_2O$ solution (400 ml) layered on dichloromethane (400 ml). The product was dried in vacuo at 80° C. (92.0 g, 72% yield). $^1$H NMR (DMSO-$d_6$, 400 MHz) δ 8.18 (2H, d, ArH), 8.00 (2H, m, ArH), 7.46 (2H, t, ArH).

General Polymerization and Film Preparation Methods

All polymerization reactions were carried in oven-dried glassware. The polymerization reactions were carried out in a round bottom flask equipped with a mechanical stirrer, an addition funnel, and a simple distillation apparatus. The copolymerization of 4,4'-dihydroxyphenyl-2,6-pyridine and/or 4,4'-dihydroxy-m-terphenyl and 4,4'-difluoro-3,3'-disodiumsulfonated-phenylsulfone (s-DFDPS) and/or 4,4'-difluorophenylsulfone was performed in NMP (N-methylpyrollidone) and toluene. Various non-sulfonated Membrane films were cast on a glass substrate from either DMAc (N,N-dimethylacetamide) or DMSO (dimethyl sulfoxide) using a doctor blade to control film thickness. Acidification of the sulfonate moieties present in various compositions was effected with 1 M $H_2SO_{4(aq)}$ to yield flexible and durable films.

Example 1

4,4'-dihydroxy-m-terphenyl (5.482 g, 20.90 mmol), $K_2CO_3$ (5.03 g, 36.4 mmol), N-methylpyrollidone (NMP) (35.0 ml) and toluene (15 ml) were charged to the reaction vessel. The mixture was stirred at 140° C. for 2.5 hours under a nitrogen atmosphere during which time the initial colorless solution turned light brown. The fluorosulfones, 4,4'-difluoro-3,3'-diphenylsulfone (DFDPS) (2.126 g, 8.363 mmol) and 4,4'-difluoro-3,3'-disodiumsulfonated-phenylsulfone (s-DFDPS) (5.747 g, 12.54 mmol), were then added. The reaction mixture was stirred and heated at about 140° C. for about 1.5 hours during which time toluene was distilled from the reaction mixture. Additional toluene was added over the course of the reaction to provide for the azeotropic removal of water. The temperature was then raised to 170° C. and the reaction mixture was stirred for 5.5 hours. The resultant highly viscous solution was cooled to room temperature, diluted with DMAc (35 ml) and then filtered over a pad of CELITE on a coarse fritted funnel The product polymer was precipitated with toluene (100 ml), filtered, washed with methanol, and dried in vacuo at 70° C.

Compositions, Film Casting and Membrane Evaluation

With reference to the structure, Table I lists the polymeric compositions prepared and tested. The compositions of Examples 2-7 (Example 2-Example 7) and Comparative Example 1 (CEx. 1) were prepared in a manner analogous to the procedure described in Example 1. It should be noted that the composition of Example 7 (R %=0, X %=0) represents a novel non-sulfonated polyethersulfone comprising structural units derived from 4,4'-dihydroxyphenyl-2,6-pyridine.

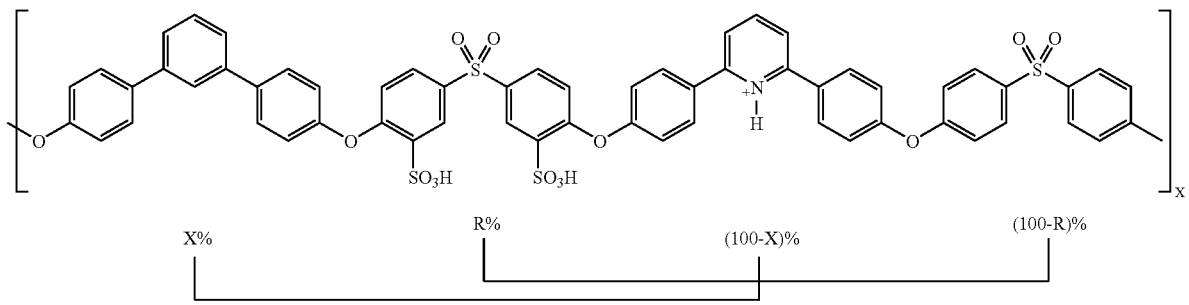

compositions were prepared, PTES and PPES among them, which exhibited glass transition temperatures of 181° C. (PTES) and 231° C. (PPES), respectively. Notably, polyethersulfones comprising a pyridine moiety possessed higher the glass transition temperatures than the corresponding carbon analogs. For example, the $T_g$ of PPES was found to be some 50° C. higher than the $T_g$ observed for PTES.

TABLE I

Examples Of Polyethersulfone Compositions

| | R (%) | X (%) |
|---|---|---|
| Ex. 1 | 40 | 100 |
| Ex. 2 | 60 | 100 |

TABLE I-continued

Examples Of Polyethersulfone Compositions

|  | R (%) | X (%) |
|---|---|---|
| Ex. 3 | 80 | 100 |
| Ex. 4 | 80 | 0 |
| Ex. 5 | 60 | 90 |
| Ex. 6 | 80 | 90 |
| Ex. 7 | 0 | 0 |
| CEx. 1 | 0 | 100 |

Films were machine cast from a solution of 25 weight percent polymer in dimetylacetamide (DMAc) solution using an Erichsen Model 411 doctor blade. Sodium sulfonate ($-SO_3^-Na^+$) groups in films prepared from polymers comprising them were conveniently converted to the corresponding sulfonic acid ($SO_3H$) groups by contacting the film with 1 molar sulfuric acid ($H_2SO_4$) for 4 hours followed by soaking the film in deionized water for 4 hours. The films were air-dried and stored until AC impedance/conductivity measurements were performed.

Four-electrode AC impedance was used to measure the conductivity of membranes. Measurements used a Parstat impedance analyzer with PowerSine software, using a signal amplitude that ranged from 5 to 50 mV and frequencies ranging from 2 Hz to 2 MHz. The sample dimensions varied between samples, with a typical sample being 1.5 cm×2.5 cm and having a thicknesses ranging from 20 to 100 µm.

TABLE II

Proton Conductivity Of Membranes Comprising Sulfonated Polyethersulfones

| Temp (° C.) | % Relative Humidity | Conductivity (S/cm) | | | | | |
|---|---|---|---|---|---|---|---|
| | | Ex.1 | Ex.2 | Ex.3 | Ex.4 | Ex. 5 | Ex.6 |
| 20 | 100 | 0.02 | 0.05 | 0.07 | 0.0009 | 0.06 | 0.019 |
| 80 | 50 | <0.0001 | 0.004 | <0.0001 | <0.0001 | <0.0001 | 0.00006 |
| 80 | 75 | 0.002 | 0.01 | <0.0001 | <0.0001 | 0.02 | 0.006 |
| 80 | 100 | 0.009 | 0.02 | 0.04 | <0.0001 | 0.07 | 0.02 |
| 100 | 50 | 0.0005 | 0.002 | 0.005 | <0.0001 | <0.0001 | 0.00006 |
| 100 | 75 | 0.001 | 0.004 | 0.02 | <0.0001 | 0.03 | 0.0044 |
| 120 | 50 | <0.0001 | <0.0001 | <0.0001 | <0.0001 | <0.0001 | 0.0001 |

Proton conductivity data for the films prepared from the novel compositions of the present invention are gathered in Table II. Conductivities of up to 0.07 S/cm (Example 3) were observed at 20° C. and 100% relative humidity for s-PTES membranes, which was comparable to that of NAFION 117® (0.08 S/cm) under identical conditions. NAFION 117® is a commercially available membrane. The membrane prepared from the composition of Example 4 ("R"=80%, "X"=0, Table 1) demonstrated reduced conductivities relative to other compositions tested. Although not wishing to be bound by any theory, it is believed that ion pairing of the pyridine and sulfonic acid moieties results in the reduced conductivity observed. It is noteworthy, however, that compositions of the present invention comprising structural units derived from 4,4'-dihydroxyphenyl-2,6-pyridine (CAS NO. 171820-16-9) generally exhibit improved mechanical properties relative to compositions lacking said structural units.

The data show that the highest conductivities are observed at high relative humidity. Conductivities start to decrease as the relative humidity is lowered.

Methanol Fuel Cell Evaluation

In addition to hydrogen-based fuel cell applications, terphenyl- and pyridine-containing sulfonated polyethersulfones show promise in direct methanol fuel cell applications. Terphenyl- and pyridine-containing sulfonated polyethersulfones (e.g., Example 2, 60% s-PTES=$1.7 \times 10^{-6}$ cm$^2$/s at 80° C.) show almost a 300% improvement in methanol permeability over NAFION 117® ($4.8 \times 10^{-6}$ cm$^2$/s at 80° C.). [Gulati, Karine. "A New Polymer Electrolyte Membrane for Direct Methanol Fuel Cell Applications." *W.L. Gore & Associates*, Inc. ECS Meeting, Paris: Apr. 30, 2003.]

Water Uptake Measurements

Water uptake was monitored by percent weight. Film samples were equilibrated at one of three different temperatures (30° C., 60° C., or 90° C.) in a water bath for approximately ten minutes. Once the sample had been equilibrated, it was removed from the aqueous medium and quickly dried on a KIMWIPE® to remove surface moisture. The sample was then weighed on a microbalance to determine the percent by mass water uptake. Results for films prepared from the compositions of the invention are gathered in Table III. Comparative Examples 2 and 3 illustrate the behavior of the commercial membrane NAFION 117 (CEx. 2) and a membrane comprising sulfonated RADEL polyethersulfone (CEx. 3) respectively.

TABLE III

Water Uptake (W/W%) Of Sulfonated Polyethersulfones And Nafion 117 ® At Various Temperatures.

| Temp (° C.) | NAFION 117 (CEx.2) | 50% $SO_3H$ s-RADEL (CEx.3) | Ex.1 | Ex.2 | Ex.3 | Ex.4 | Ex.5 | Ex.6 |
|---|---|---|---|---|---|---|---|---|
| 30 | 15 | 62 | 9 | 73 | 91 | 14 | 12 | 66 |
| 60 | 17 | 65 | 10 | 91 | 230 | 17 | 18 | 204 |
| 90 | 20 | 78 | 17 | 133 | —[a] | 22 | 34 | 1657 |

[a] Sample dissolved

The data provided in Table III indicate that the amount of water uptake for sulfonated poly(terphenyl ether sulfones (s-PTES) was directly proportional to the sulfonation content. Although the 40% sulfonated sample, 40% s-PTES (Example 1) absorbed only 17 wt % water at 90° C., under identical conditions, 60% s-PTES (Example 2) took up 133 wt %, and 80% s-PTES (Example 3) dissolved in the aqueous solution. Interestingly, the membranes comprising structural units derived from 4,4'-dihydroxyphenyl-2,6-pyridine exhibited superior water uptake properties. Thus, a membrane prepared from the composition of Example 5 (60% s-PTPES) wherein 10% mole percent of the structural units derived from a bisphenol were structural units derived from 4,4'-dihydroxyphenyl-2,6-pyridine, absorbed only 34 wt % water at 90° C. Thus the membrane prepared from the composition of Example 5 exhibited superior water absorption characteristics relative to a membrane prepared using the known material sulfonated-RADEL polyethersulfone (s-RADEL) (CEx. 3). The membrane prepared from the composition of Example 5 exhibited comparable water uptake relative to the NAFION 117 membrane (CEx. 2).

The invention has been described in detail with particular reference to preferred embodiments thereof, but it will be understood by those skilled in the art that variations and modifications can be effected within the spirit and scope of the invention.

What is claimed is:

1. A polymer composition comprising structural units I

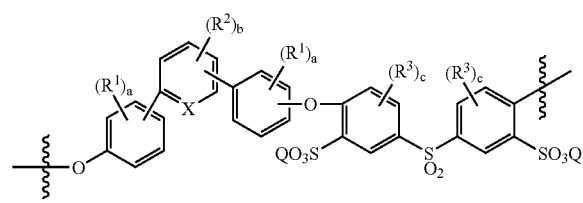

wherein $R^1$, $R^2$, and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; X is N, or $^+$NH; Q is independently at each occurrence hydrogen, a metal cation, a non-metallic inorganic cation, or an organic cation; "a" is independently at each occurrence an integer from 0 to 4; and "b" and "c" are independently at each occurrence integers from 0 to 3.

2. The polymer composition according to claim 1, further comprising subunits derived from 1,3-(bis(4-hydroxyphenyl))benzene.

3. The polymer composition according to claim 1, further comprising subunits derived from 1,4-(bis(4-hydroxyphenyl))benzene.

4. The polymer composition according to claim 1, comprising subunits derived from 2,6-(bis(4-hydroxyphenyl))pyridine.

5. The polymer composition according to claim 1, comprising subunits derived from the disulfonated bis(4-halophenyl)sulfone II

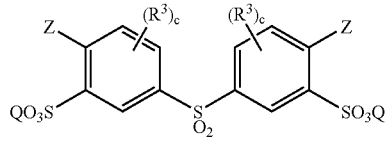

wherein Z is independently at each occurrence fluoro, chloro, or bromo; $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; Q is independently at each occurrence hydrogen, a metal cation, a non-metallic inorganic cation, or an organic cation; and "c" is independently at each occurrence an integer from 0 to 3.

6. A polymer composition comprising structural units III

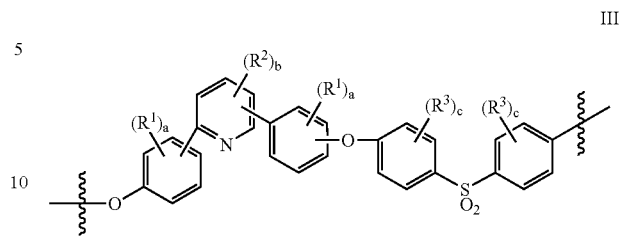

wherein $R^1$, $R^2$, and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; "a" is independently at each occurrence an integer from 0 to 4; and "b" and "c" are independently at each occurrence integers from 0 to 3.

7. The polymer composition according to claim 6 further comprising subunits IV

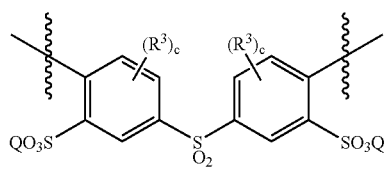

wherein $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; Q is independently at each occurrence hydrogen, a metal cation, a non-metallic inorganic cation, or an organic cation; and "c" is independently at each occurrence an integer from 0 to 3.

8. The polymer composition according to claim 7 comprising subunits derived from 2,6-(bis(4-hydroxyphenyl))pyridine.

9. The polymer composition according to claim 7 comprising subunits derived from at least one bis(halophenyl)sulfone selected from the group consisting of bis(4-chlorophenyl)sulfone and bis(4-fluorophenyl)sulfone.

10. An article comprising a polyethersulfone composition, said composition comprising structural units I

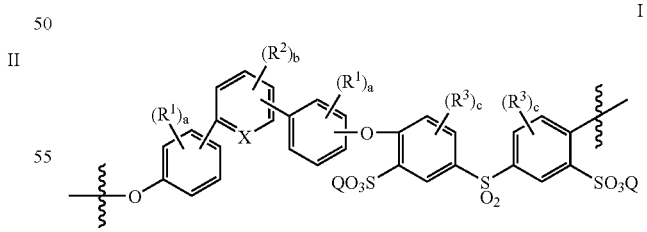

wherein $R^1$, $R^2$ and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; X is N, or $^+$NH; Q is independently at each occurrence hydrogen, a metal cation, a non-metallic inorganic cation, or an organic cation; "a" is independently at each occurrence an integer from 0 to 4; "b" and "c" are independently at each occurrence integers from 0 to 3.

11. The article according to claim 10 comprising at least one film layer comprising said polyethersulfone composition.

12. The article according to claim 11 which is a membrane.

13. The article according to claim 12 which is a fuel cell membrane.

14. A method for making a polymer composition comprising structural units I

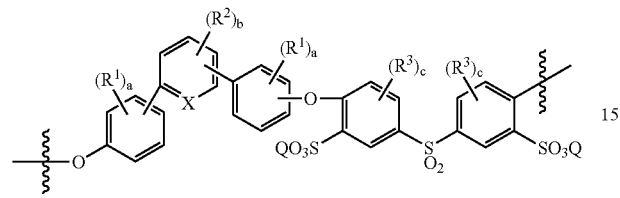

wherein $R^1$, $R^2$, and $R^3$ are independently at each occurrence halogen, a $C_1$-$C_{10}$ aliphatic radical, a $C_3$-$C_{12}$ cycloaliphatic radical, or a $C_3$-$C_{15}$ aromatic radical; X is N, $^+$NH, CH, or C; Q is independently at each occurrence hydrogen, a metal cation, a non-metallic inorganic cation, or an organic cation; "a" is independently at each occurrence an integer from 0 to 4 "b" and "c" are independently at each occurrence integers from 0 to 3;

said method comprising:

contacting in a solvent in the presence of a base under reactive conditions (a) at least one dihydroxy aromatic compound having structure V

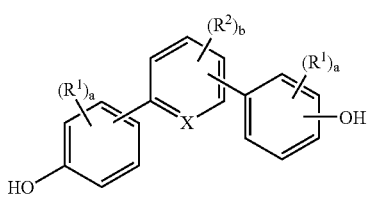

wherein $R^1$, and $R^2$ are independently at each occurrence halogen, a $C_1$-$C_{10}$ aliphatic radical, a $C_3$-$C_{12}$ cycloaliphatic radical, or a $C_3$-$C_{15}$ aromatic radical; X is N, or $^+$NH; and "a" is independently at each occurrence an integer from 0 to 4; "b" is independently at each occurrence integer from 0 to 3;

with (b) at least one disulfonated bis(4-halophenyl)sulfone having structure II

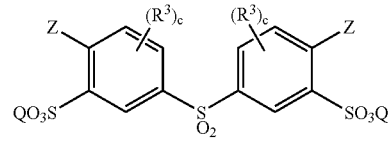

wherein, in structure II, Z is independently at each occurrence fluoro, chloro, or bromo; $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; Q is independently at each occurrence hydrogen, a metal cation, a non-metallic inorganic cation, or an organic cation; and "c" is independently at each occurrence an integer from 0 to 3;

and, optionally, (c) one or more dihalodiphenyl sulfones having structure VI

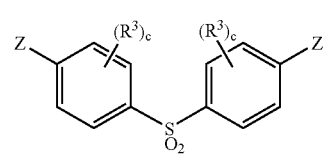

wherein, in structure VI, Z is independently at each occurrence fluoro, chloro, or bromo; $R^3$ is independently at each occurrence halogen, a $C_1$-$C_{10}$ aliphatic radical, a $C_3$-$C_{12}$ cycloaliphatic radical, or a $C_3$-$C_{15}$ aromatic radical; and "c" is independently at each occurrence an integer from 0 to 4.

15. The method according to claim 14 wherein said at least one dihydroxy aromatic compound comprises at least one bisphenol chosen from 1,3-(bis(4-hydroxyphenyl))benzene, 1,4-(bis(4-hydroxyphenyl))benzene, and 2,6-(bis(4-hydroxyphenyl))pyridine.

16. The method according to claim 14 wherein said at least one dihydroxy aromatic compound comprises 2,6-(bis(4-hydroxyphenyl))pyridine.

17. A polymer composition comprising structural units VII

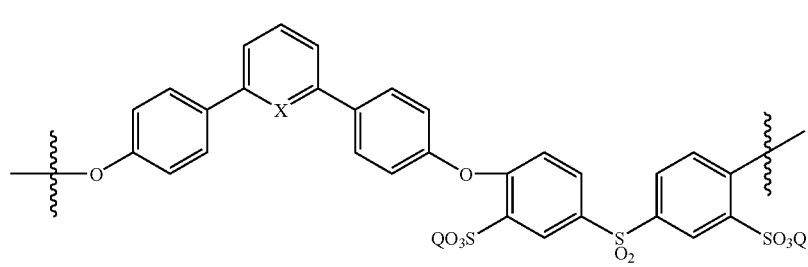

wherein X is N, or $^+$NH; and Q is independently at each occurrence hydrogen, a metal cation, a non-metallic inorganic cation, or an organic cation.

18. The polymer composition according to claim 17, comprising subunits derived from 2,6-(bis(4-hydroxyphenyl))pyridine.

19. An article comprising a polyethersulfone composition, said composition comprising structural units VII

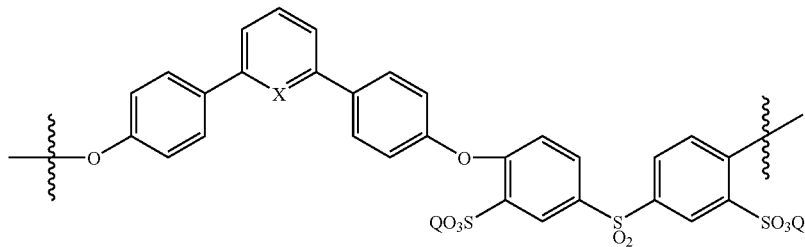

wherein X is N, or $^+$NH; and Q is independently at each occurrence hydrogen, a metal cation, a non-metallic inorganic cation, or an organic cation.

20. The article according to claim 19 comprising at least one film layer comprising said polyethersulfone composition.

21. The article according to claim 19 which is a membrane.

22. An article comprising a polyethersulfone composition, said composition comprising structural units VIII

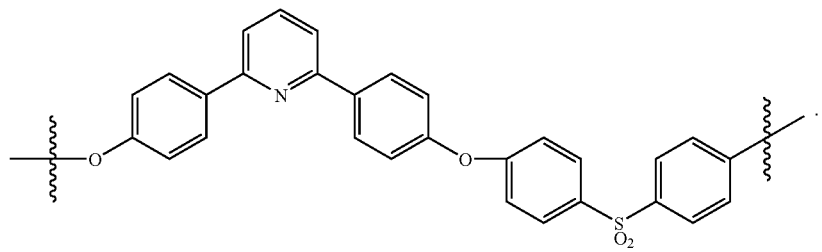

23. The article according to claim 22 comprising at least one film layer comprising said polyethersulfone composition.

24. The article according to claim 22 which is a membrane.

25. The article according to claim 22 which is a molded article.

* * * * *